(12) United States Patent
Zink

(10) Patent No.: US 11,221,065 B2
(45) Date of Patent: Jan. 11, 2022

(54) VEHICLE DRIVELINE COMPONENT HAVING DIFFERENTIAL ASSEMBLY WITH INTEGRATED ELECTRONICALLY-CONTROLLED LIMITED SLIP AND LOCKING FUNCTIONALITY

(71) Applicant: American Axle & Manufacturing, Inc., Detroit, MI (US)

(72) Inventor: Frederick E. Zink, Capac, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/230,028

(22) Filed: Apr. 14, 2021

(65) Prior Publication Data

US 2021/0348675 A1 Nov. 11, 2021

Related U.S. Application Data

(60) Provisional application No. 63/020,910, filed on May 6, 2020.

(51) Int. Cl.
*F16H 48/22* (2006.01)
*F16H 48/30* (2012.01)
*B60K 17/16* (2006.01)

(52) U.S. Cl.
CPC ............. *F16H 48/22* (2013.01); *F16H 48/30* (2013.01)

(58) Field of Classification Search
CPC .......... F16H 48/22; F16H 48/30; B60K 17/30
See application file for complete search history.

(56) References Cited

U.S. PATENT DOCUMENTS

| | | | |
|---|---|---|---|
| 3,063,529 A | 9/1959 | Cook | |
| 5,030,181 A | 7/1991 | Keller | |
| 5,098,360 A | 3/1992 | Hirota | |
| 5,911,643 A | 6/1999 | Godlew et al. | |
| 6,309,320 B1* | 10/2001 | Forrest | F16H 48/22 475/150 |
| 6,537,172 B1* | 3/2003 | McAuliffe, Jr | F16H 48/30 475/150 |
| 7,001,303 B1 | 2/2006 | Peura | |
| 7,775,926 B2* | 8/2010 | Sugaya | F16H 48/34 475/85 |
| 2002/0132693 A1* | 9/2002 | Forrest | F16H 48/22 475/150 |
| 2018/0031052 A1 | 2/2018 | Diemer | |

* cited by examiner

*Primary Examiner* — Tinh Dang
(74) *Attorney, Agent, or Firm* — Burris Law, PLLC

(57) ABSTRACT

A vehicle driveline component having a differential assembly that includes a limited slip clutch, a locking clutch and an actuator for operating the limited slip clutch and the locking clutch. The actuator includes a pair of ball-ramp mechanisms that share a rotatable ball-ramp ring.

27 Claims, 10 Drawing Sheets

VEHICLE DRIVELINE COMPONENT HAVING DIFFERENTIAL ASSEMBLY WITH INTEGRATED ELECTRONICALLY-CONTROLLED LIMITED SLIP AND LOCKING FUNCTIONALITY

CROSS-REFERENCE TO RELATED APPLICATIONS

This application claims the benefit of U.S. Provisional Patent Application No. 63/020,910 filed May 6, 2020, the disclosure of which is incorporated by reference as if fully set forth in detail herein.

FIELD

The present disclosure relates to a vehicle driveline component having a differential assembly with integrated electronically-controlled limited slip and locking functionality.

BACKGROUND

This section provides background information related to the present disclosure which is not necessarily prior art.

Various vehicle driveline components, such as rear axle assemblies, commonly employ a differential assembly to transmit rotary power to a set of vehicle drive wheels in a manner that permits speed differentiation between the two drive wheels. In many applications, it can be desirable to attenuate, limit or entirely disable the ability of the differential assembly to permit speed differentiation between the two drive wheels. To address this need, various locking differential configurations and various limited slip differential assembly configurations have been developed.

The locking differential configurations typically employ some type of coupling or clutch to lock the input of the differential assembly to one of the outputs of the differential assembly. For example, it is common to use a dog clutch to selectively lock a side gear to a differential case. A differential assembly with this configuration can be toggled between an open state, in which speed differentiation is permitted, and a locked state in which speed differentiation is inhibited. This configuration does not permit the differential assembly to operate in a limited slip mode that limits (but does not inhibit) speed differentiation between the vehicle drive wheels.

The limited slip differential configuration typically utilizes one or more sets of friction clutches to resist relative rotation between the input of the differential assembly and one or both of the outputs of the differential assembly. In some situations, each of the friction clutches may be pre-loaded via a spring so that the output(s) of the differential assembly will slip relative to the input of the differential assembly only when a differential torque between the input of the differential assembly and the output of the differential assembly exceeds a preset threshold. The tendency of the gearing of some differential assemblies to urge the side gears of the differential gearing axially apart can be employed in some limited slip differential configurations to further load the friction clutch(es), or alternatively, could be the sole source of load on the friction clutch(es).

One drawback with the limited slip differential configurations described above is that they can affect speed differentiation during times where operation in an open state would be more desirable, such as maneuvering a vehicle in a parking lot to park the vehicle. Additionally, the above-described limited slip differential configurations do not typically "lock" the differential assembly to inhibit speed differentiation between the outputs of the differential assembly. Modernly, electronic actuators have been employed to control engagement of the friction clutches in a limited slip differential assembly. While such configurations provide the ability to vary the magnitude of the threshold in the differential torque between the input of the differential assembly and the output of the differential assembly that is needed to permit speed differentiation between the outputs of the differential assembly, one drawback to this approach concerns the size and configuration of the friction clutch(es) and the actuator if the friction clutch(es) are to be utilized to lock the differential assembly. In this regard, both the friction clutch(es) and the actuator need to be relatively large so that all torque that is to be carried by the differential assembly can be transmitted between the input of the differential assembly and a single one of the outputs of the differential assembly.

To address this drawback, differential assemblies have been configured with two separate clutch or couplings that are operated by two separate actuators. Examples of such differential assemblies are shown in U.S. Pat. Nos. 5,098,360 and 5,030,181. While such configurations provide the desired limited slip and locking capabilities, they are nevertheless relatively bulky and somewhat difficult to package into a driveline for a modern automotive vehicle.

SUMMARY

This section provides a general summary of the disclosure and is not a comprehensive disclosure of its full scope or all of its features.

In one form, the present disclosure provides a vehicle driveline component having a differential assembly that includes a differential input member, which is rotatable about an axis, a differential gearset, a limited slip clutch, a locking clutch, and an actuation mechanism. The differential gearset is disposed in the differential input member and includes a first side gear and a second side gear. The limited slip clutch has a clutch pack with a set of first clutch plates, which are non-rotatably but axially slidably coupled to the differential input member, and a set of second clutch plates that are interleaved with the first clutch plates and which are axially slidably but non-rotatably coupled to the first side gear. The locking clutch has a first dog member, which is fixedly coupled to the second side gear, and a second dog member that is axially slidably but non-rotatably coupled to the differential input member. The second dog member is movable along the axis between a first position, in which the second dog member is disengaged from the first dog member so as to permit rotation of the first dog member relative to the second dog member, and a second position in which the second dog member is engaged to the first dog member so as to inhibit rotation of the first dog member relative to the second dog member. The actuation mechanism is configured to operate the limited slip clutch and the locking clutch. The actuation mechanism has a first ball-ramp mechanism for selectively operating the locking clutch and a second ball-ramp mechanism for selectively operating the limited slip clutch. The first and second ball-ramp mechanisms each having a set of rotatable ball-tracks. The set of rotatable ball-tracks of the first ball-ramp mechanism are rotationally coupled to the set of rotatable ball-tracks for the second ball-ramp mechanism.

In another form, the present disclosure provides a vehicle driveline component having a differential assembly that includes a differential input member, which is rotatable about an axis, a differential gearset, a limited slip clutch, a coupling, and an actuation mechanism. The differential gearset is disposed in the differential input member and includes a first side gear and a second side gear. The limited slip clutch has a clutch pack with a set of first clutch plates, which are non-rotatably but axially slidably coupled to the differential input member, and a set of second clutch plates that are interleaved with the first clutch plates and which are axially slidably but non-rotatably coupled to the first side gear. The coupling has a first coupling member, which is fixedly coupled to the second side gear, and a second coupling member that is slidable along the axis relative to the first coupling member between a first position, in which the second coupling member is rotationally decoupled from the first coupling member, and a second position in which the second coupling member is coupled for rotation with the first coupling member. The actuation mechanism is configured to operate the limited slip clutch and the coupling. The actuation mechanism has a first ball-ramp mechanism for selectively operating the locking clutch and a second ball-ramp mechanism for selectively operating the limited slip clutch. The first and second ball-ramp mechanisms each having a set of rotatable ball-tracks. The set of rotatable ball-tracks of the first ball-ramp mechanism are rotationally coupled to the set of rotatable ball-tracks for the second ball-ramp mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
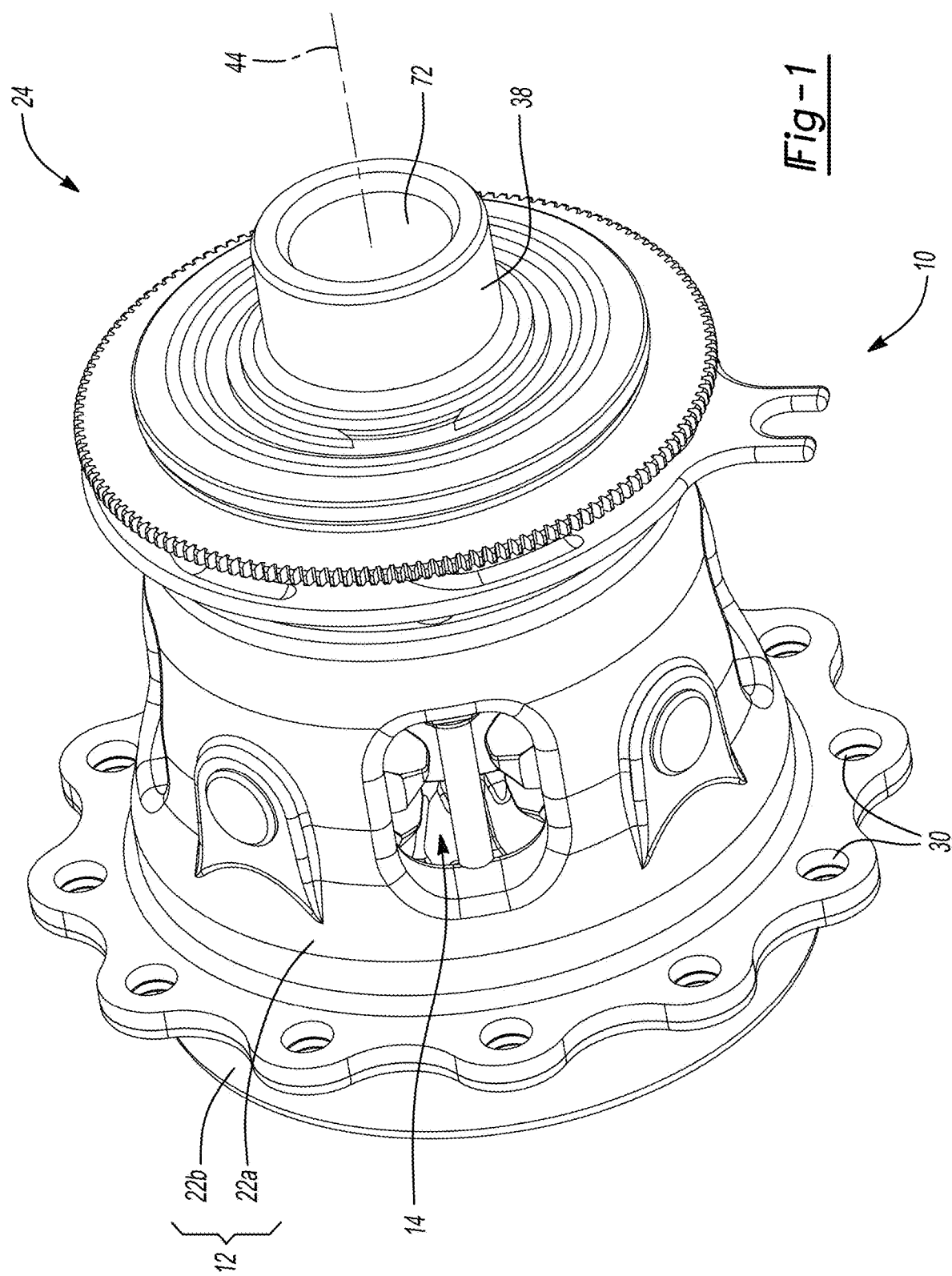
FIG. 1 is a perspective view of a differential assembly constructed in accordance with the teachings of the present disclosure.
Figure 2:
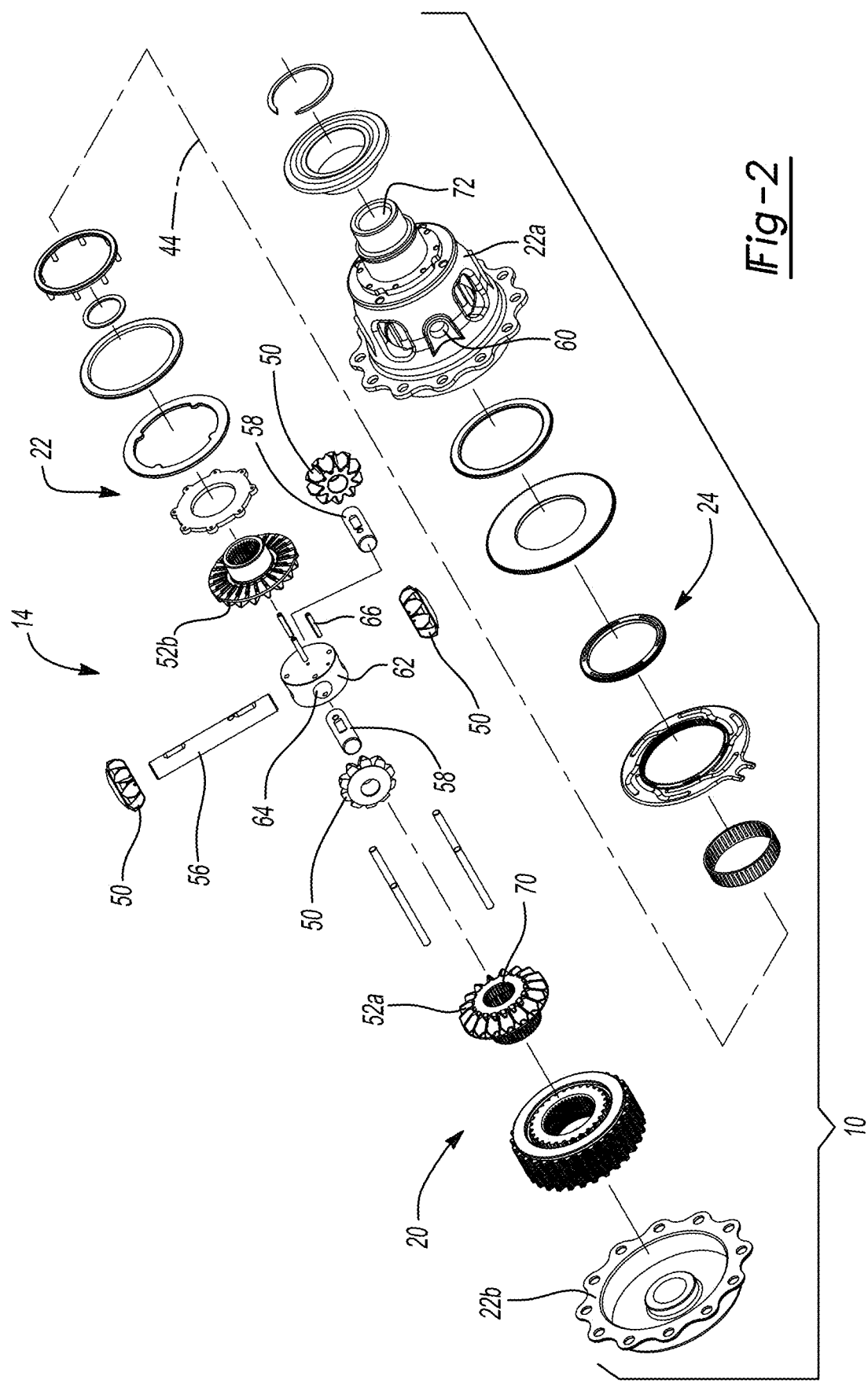
FIGS. 2 and 3 are exploded perspective views of the differential assembly of FIG. 1.
Figure 3:
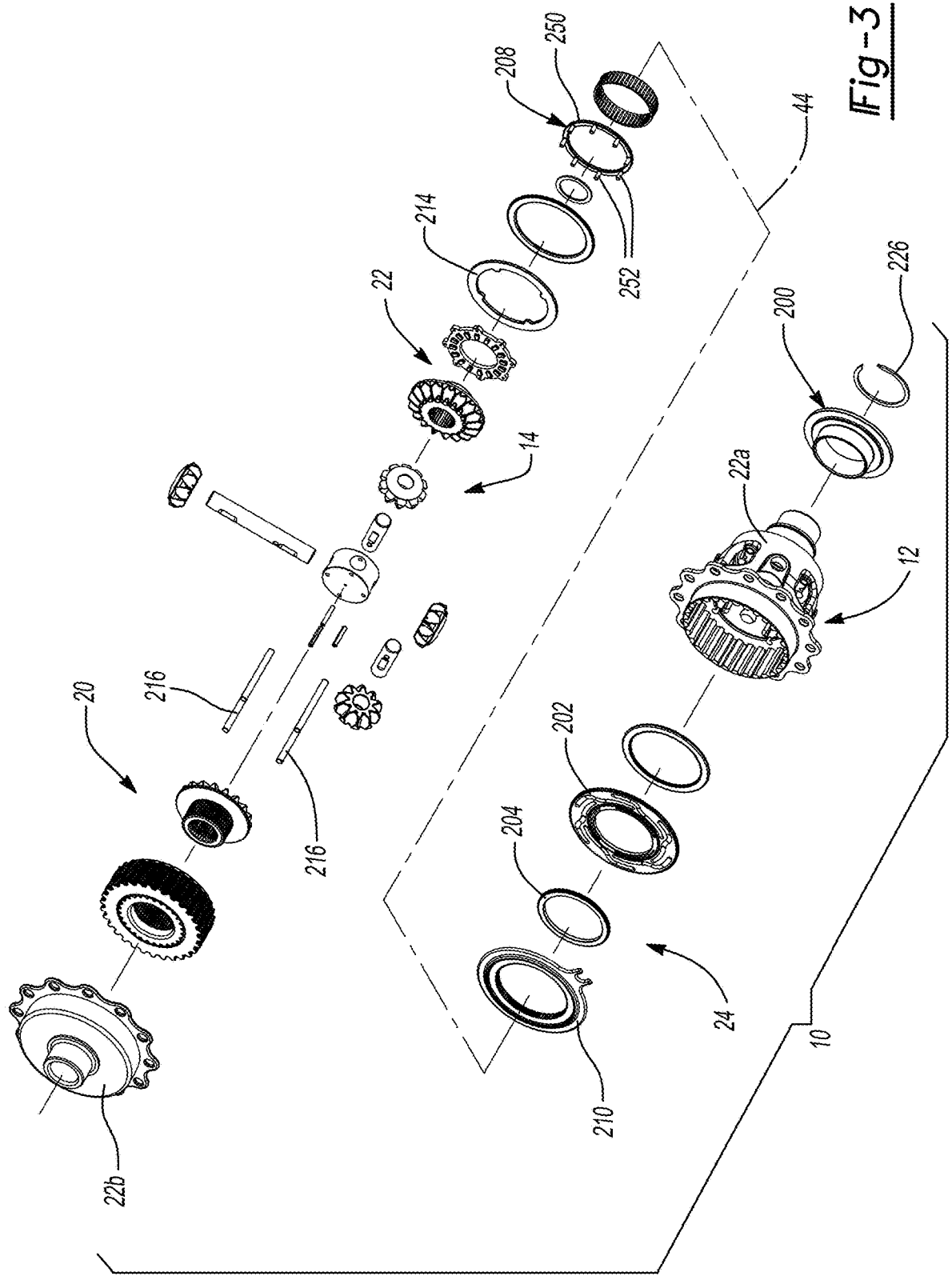

With reference to FIGS. 1 through 3 of the drawings, an exemplary differential assembly for a vehicle driveline component is generally indicated by reference numeral 10. The differential assembly 10 can include a differential input member 12, a differential gearset 14 and a multi-mode actuation mechanism having a limited slip mechanism 20, a locking mechanism 22 and an actuation mechanism 24.

Figure 4:
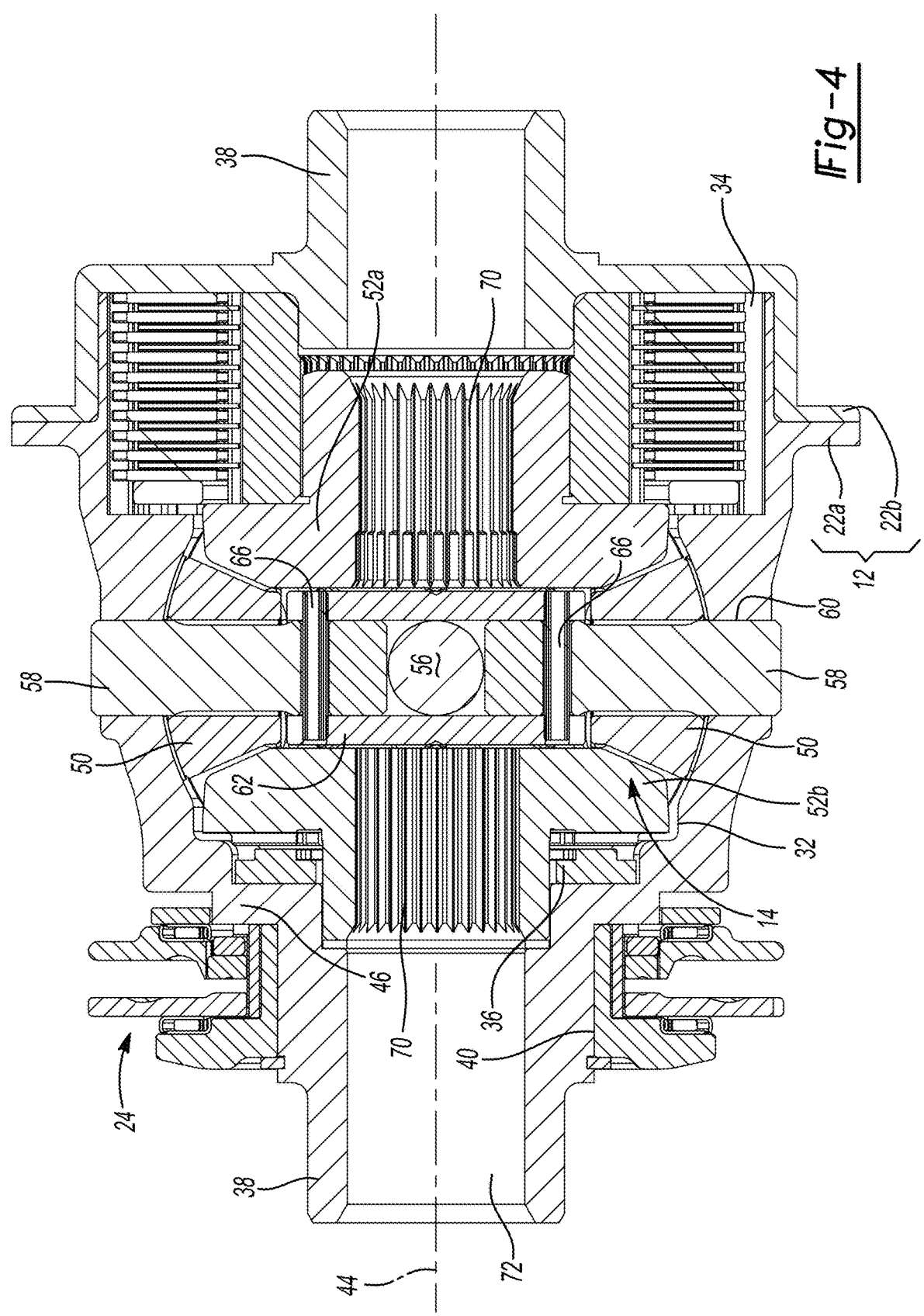
FIG. 4 is a longitudinal cross-sectional view of the differential assembly of FIG. 1.

With reference to FIGS. 1 and 4, the differential input member 12 can be formed of one or more components and is configured to be rotationally coupled to a ring gear (not shown). The ring gear can be a bevel gear (e.g., spiral bevel gear or hypoid gear) or could be a helical gear, for example. In the example provided, the differential input member 12 is formed of first and second case member 22a and 22b, respectively, that are fixedly coupled to one another, such as via bolts (not shown) that are received through holes 30 in abutting flanges formed on the first and second case member 22a and 22b that are threaded into holes (not shown) in the ring gear. The differential input member 12 can define a gearset cavity 32, a limited slip mechanism cavity 34, a locking mechanism cavity 36, a pair of trunnions 38 and an actuation mechanism mount 40.

The gearset cavity 32 is configured to receive the differential gearset 14 therein. The limited slip mechanism cavity 34 can be disposed concentrically about a first axial end of the differential gearset cavity 32 and is sized to receive the limited slip mechanism 20 therein. The locking mechanism cavity 36 can be disposed concentrically about a second axial end of the differential gearset cavity 32 and is sized to receive the locking mechanism 22 therein. The trunnions 38 are disposed on opposite axial ends of the differential input member 12 and are each sized on their outside cylindrical surface to receive a race (not shown) of a differential bearing (not shown) thereon. The differential bearing is conventionally employed to support the differential input member 12 for rotation about a rotational axis 44 relative to a housing (not shown), such as an axle or carrier housing. The actuation mechanism mount 40 can be a circumferentially extending surface on the exterior of the second case member 22b that is located axially between the trunnion 38 on the second axial end of the differential input member 12 and the locking mechanism cavity 36. An annular shoulder wall 46 extends radially from the circumferentially extending surface of the actuation mechanism mount 40. The actuation mechanism mount 40 is sized to receive a portion of the actuation mechanism 24 thereon as will be described in more detail below.

With reference to FIGS. 2 and 4, the differential gearset 14 can be configured in any desired manner. In the example shown, the differential gearset 14 employs a plurality of differential pinions 50 and a pair of side gears 52a and 52b, all of which can employ straight bevel gear teeth. In the example shown, a quantity of four differential pinions 50 are employed, but it will be appreciated that the quantity of differential pinions 50 can be different from what is shown herein. Each of the differential pinions 50 can be coupled to the differential input member 12 for rotation therewith about the rotational axis 44, and can each be rotatable relative to the differential input member 12 for rotation about a respective pinion axis. In the example provided, two of the differential pinions 50 are journally supported by a cross-pin 56, while the remaining two differential pinions 50 are each journally supported by a respective pin segment 58. The cross-pin 56 can be received through a cross-pin bore (not specifically shown) that is formed through the differential input member 12 perpendicular to the rotational axis 44, while the pin segments 58 can be received into a pin segment bore 60 that is orthogonal to the rotational axis 44 and the cross-pin bore. The opposite axial ends of the cross-pin 56 and the distal or radially outer end of each of the pin segments 58 can engage the differential input member 12. The cross-pin 56 and the pin segments 58 can be secured to one another in any desired manner. In the example provided, a cylindrical plate 62 is received in the gearset cavity 32 radially inwardly of the differential pinions 50. The cylindrical plate 62 has a first aperture (not specifically shown), through which the cross-pin 56 is received, and a second aperture 64 that is perpendicular to the first aperture, into which the proximal or radially inward ends of each of the pin segments 58 is received. The cross-pin 56 and each of the pin segments 58 can be fixedly coupled to the cylindrical plate 62 in any desired manner. As shown, roll-pins 66 are received into longitudinally extending holes (not specifically shown) in the cylindrical plate 62 and into respective holes formed in the cross-pin 56 and the pin segments 58 to fixedly couple the cross-pin 56, the pin segments 58 and the cylindrical plate 62 to one another. Each of the side gears 52a and 52b is rotatable about the rotational axis 44 relative to the differential input member 12 and is meshingly engaged with the differential pinions 50. Each of the side gears 52a and 52b defines an internally-splined or toothed aperture 70 that is configured to axially slidably but non-rotationally engage an externally-splined or toothed segment (not shown) of a respective output shaft (not shown). Each of the output shafts can be received in a shaft bore 72 formed in the differential input member 12 and can pass outwardly from the differential input member 12 through an associated one of the trunnions 38.

Figure 6:
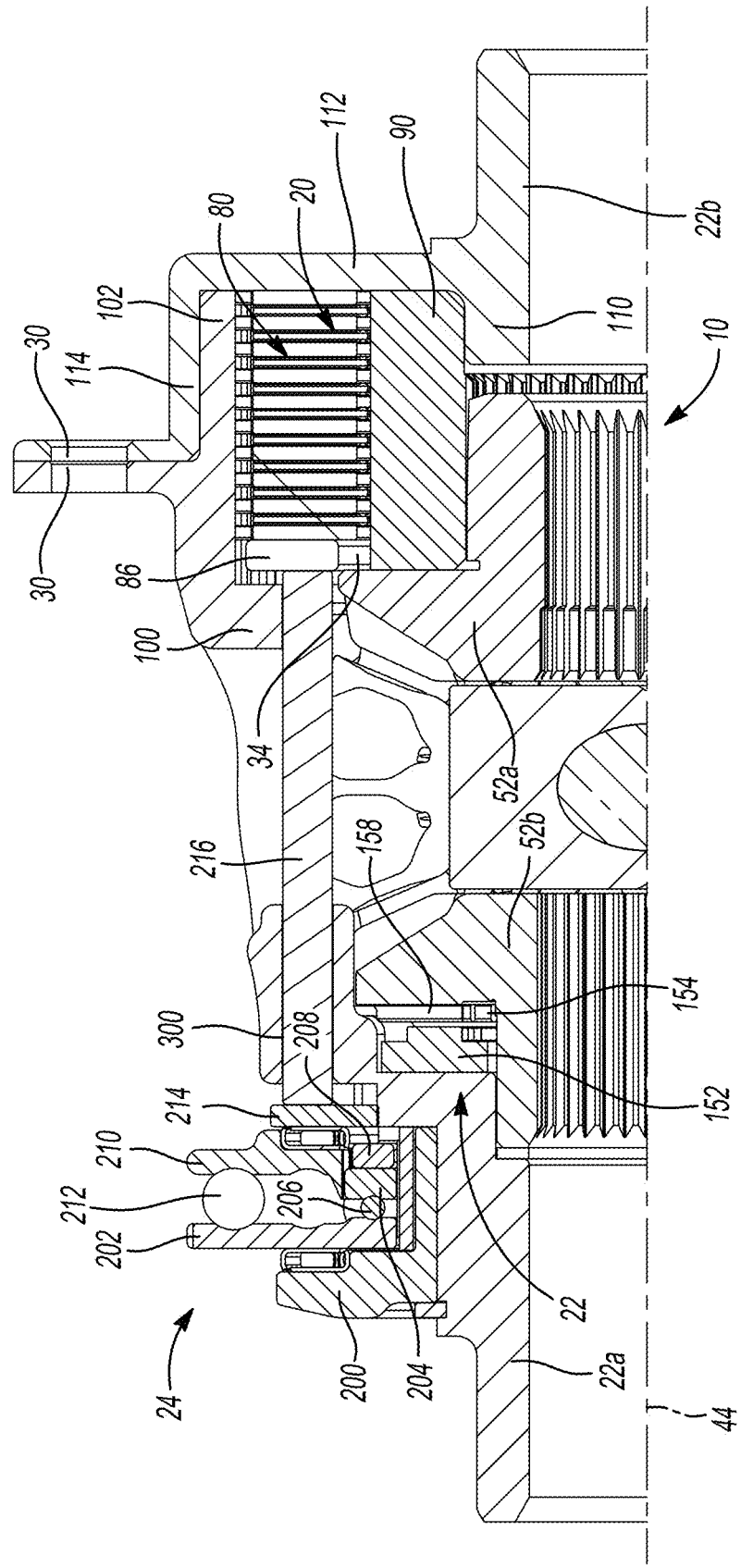
FIG. 6 is a section view taken along the line 6-6 of FIG. 5.
Figure 7:
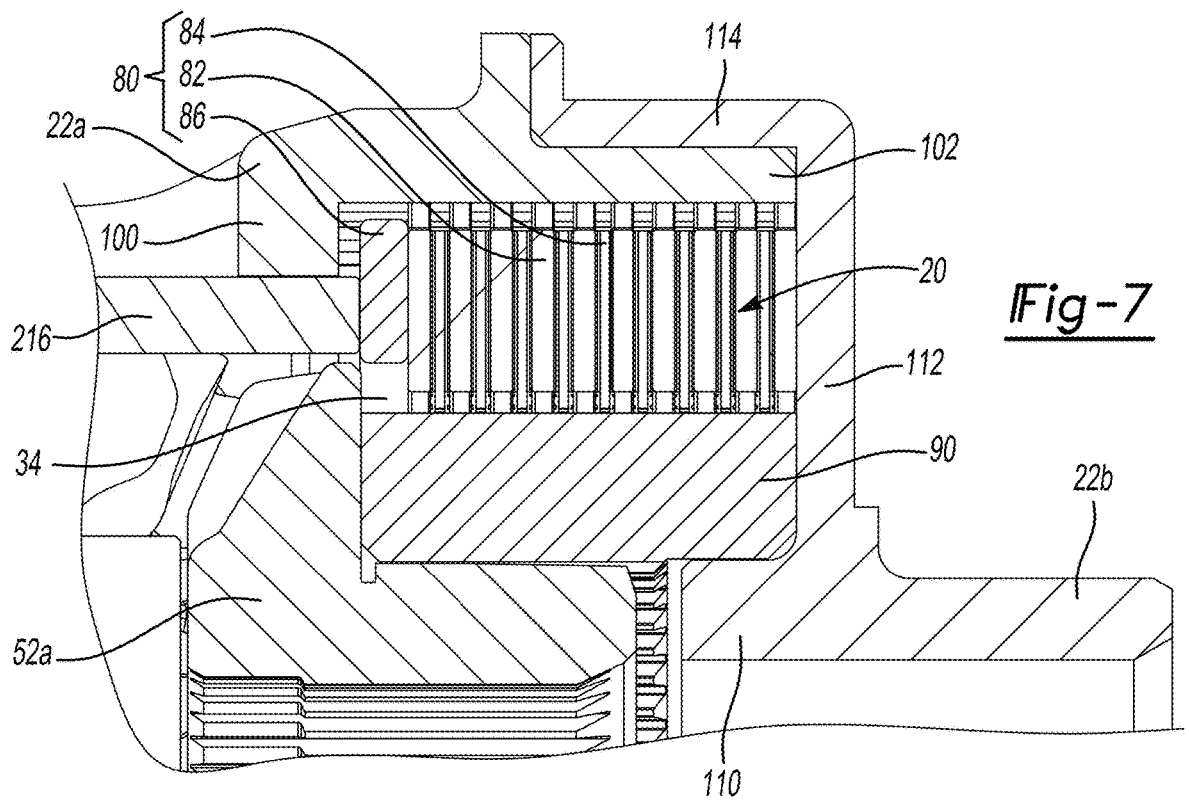
FIG. 7 is an enlarged portion of FIG. 6 illustrating a limited slip mechanism in more detail.
Figure 8:
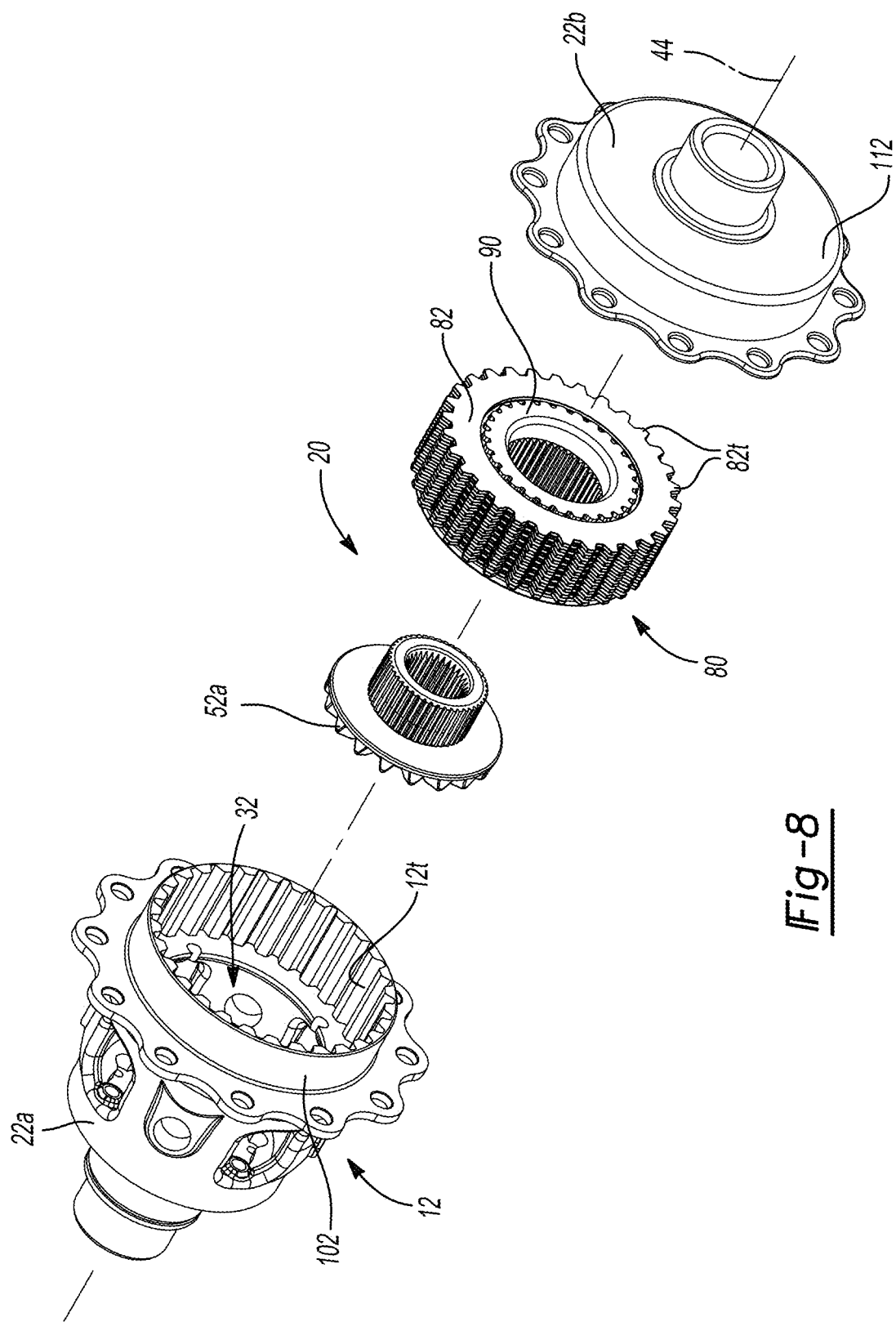
FIG. 8 is an exploded perspective view of a portion of the differential assembly of FIG. 1 illustrating the limited slip mechanism in more detail.
Figure 9:
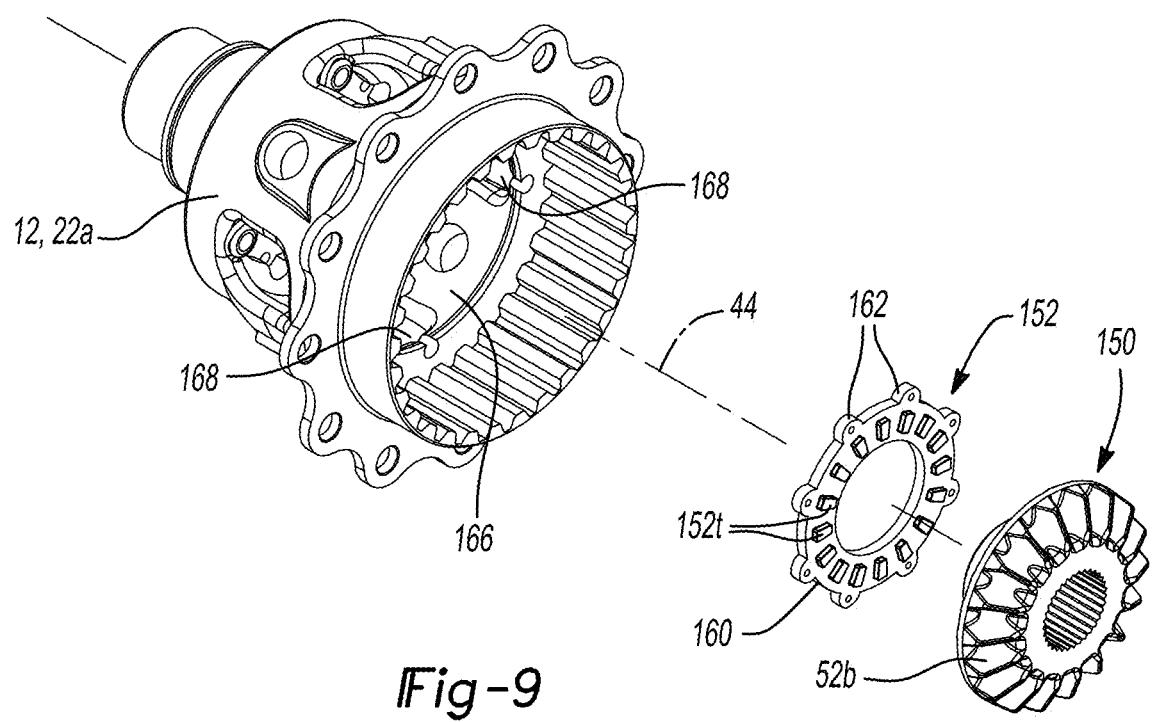
FIGS. 9 and 10 are exploded perspective views of respective portions of the differential assembly of FIG. 1 illustrating a locking mechanism in more detail.
Figure 10:
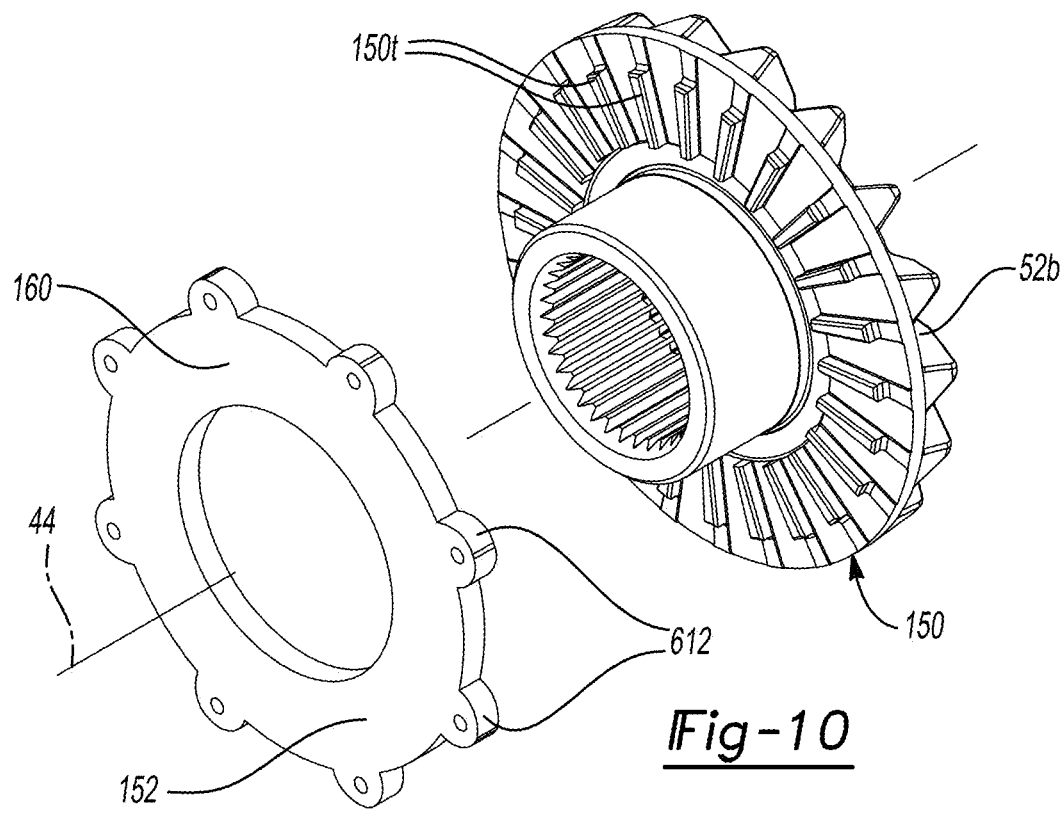

With reference to FIGS. 6, 7 and 8, the limited slip mechanism 20 can include a clutch pack 80 that can have clutch elements that are rotationally coupled to differential input member 12 and the side gear 52a. In the example provided, the limited slip mechanism 20 has a plurality of first friction plates 82, a plurality of second friction plates 84, and an apply plate 86. Each of the first friction plates 82 can have a set of teeth 82t about their outer circumference that can engage with a set of mating teeth 12t on the inner circumference of the portion of the differential input member 12 that forms the limited slip mechanism cavity 34 so that the first friction plates 82 are non-rotatably but axially slidably coupled to the differential input member 12. The second friction plates 84 are interleaved with the first friction plates 82. Each of the second friction plates can have a set of teeth (not specifically shown) about their inner circumference that can engage with a set of teeth that are coupled for rotation with the side gear 52a. As shown, the teeth on the inner circumference of the second friction plates 84 are engaged to a set of teeth that are formed onto a hub 90, and the hub 90 includes a set of internal teeth that are engaged to a set of external teeth formed on the side gear 52a and as such, the hub 90 is non-rotatably but axially slidably coupled to the side gear 52a. It will be appreciated, however, that the hub 90 can be integrally and unitarily formed with the side gear 52a and as such, the hub 90 need not be formed as a separate and distinct component.

In the example shown, the first case member 22a has an annular, radially extending wall 100 and a circumferentially extending wall 102 that extends axially from the radially extending wall 100. The set of teeth formed on the inner circumference of the differential input member 12 that are engaged by the teeth on the first friction plates 82 is formed on the circumferentially extending wall 102. The second case member 22b is formed as a cap that is secured to the open axial end of the first case member 22a to close the gearset cavity 32 and the limited slip mechanism cavity 34. The second case member 22b includes a journal portion 110, an end wall 112 and a circumferentially extending wall member 114. The journal portion 110 rotationally supports a portion of the hub 90 to maintain the hub 90 concentric about the rotational axis 44. The end wall 112 has an annular shape and extends radially between the journal portion 110 and the circumferentially extending wall member 114. The circumferentially extending wall member 114 is received about and engages the outside circumferential surface of the circumferentially extending wall 102 on the first case member 22a to thereby align the second case member 22b to the first case member 22a about the rotational axis 44.

The apply plate 86 can have a set of teeth (not specifically shown) formed on its outer circumferential surface that can matingly engage the set of mating teeth 12t on the inner circumference of the portion of the differential input member 12 that forms the limited slip mechanism cavity 34 (e.g., the set of mating teeth 12t on the circumferentially extending wall 102 on the first case member 22a in the example provided) so that the apply plate 86 is non-rotatably but axially slidably coupled to the differential input member 12. The apply plate 86 can be disposed along the rotational axis 44 axially between the radially extending wall 100 of the first case member 22a and the first and second friction plates 82 and 84.

With reference to FIGS. 6 and 9 through 11, the locking mechanism 22 comprises a dog clutch in the example provided and has a first dog member 150, a second dog member 152 and a return spring 154. The first dog member 150 can include a set of first teeth 150t that can be fixedly coupled to the side gear 52b. The second dog member 152 can be non-rotatably but axially slidably coupled to the differential input member 12 and can include a set of second teeth 152t. In the example shown, the second dog member 152 has an annular plate-like body 160 and a plurality of tabs 162 that extend radially from the body 160. The first case member 22a can define a plate bore 166, which is sized to slidably receive the body of the second dog member 152, and a plurality of tab recesses 168, which are each sized to slidably receive an associated one of the tabs 162. It will be appreciated that receipt of the tabs 162 into the tab recesses 168 inhibits relative rotation between the second dog member 152 and the differential input member 12, as well as that the tabs 162 and the tab recesses 168 cooperate to guide the second dog member 152 as it is translated along the rotational axis 44. The second dog member 152 is movable along the rotational axis between a first position, in which the teeth 152t of the second dog member 152 are disengaged from the teeth 150t of the first dog member 150 to thereby permit relative rotation between the side gear 52b and the differential input member 12 (corresponding to operation of the differential assembly 10 in an open state), and a second position in which the teeth 152t of the second dog member 152 are engaged to the teeth 150t of the first dog member 150 to thereby inhibit relative rotation between the side gear 52b and the differential input member 12 (corresponding to operation of the differential assembly 10 in a locked state). The return spring 154 can be any type of spring, such as a wave spring, and can be disposed between the first and second dog members 150 and 152 to bias the second dog member 152 along the rotational axis 44 away from the first dog member 150.

Figure 5:
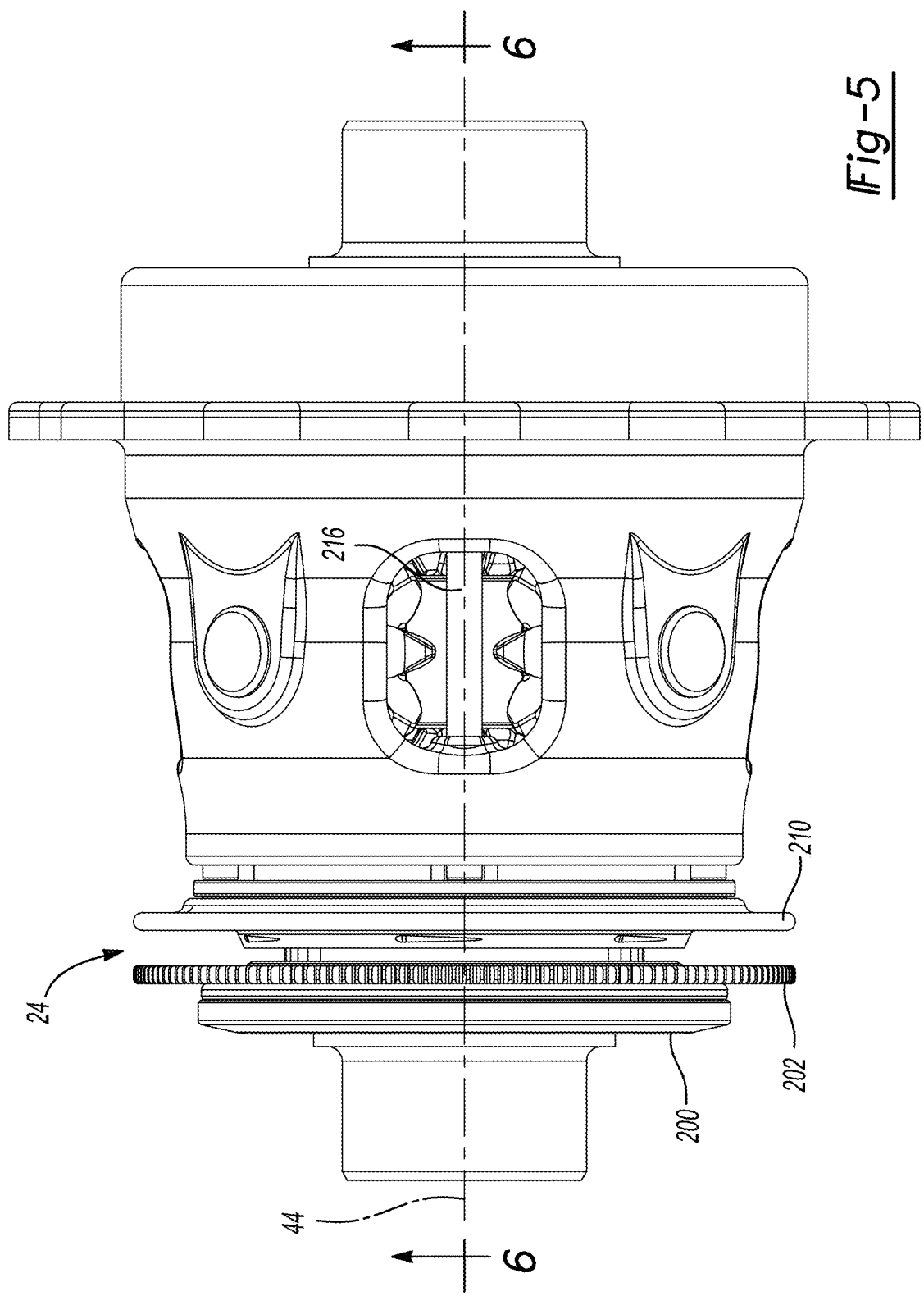
FIG. 5 is a side elevation view of the differential assembly of FIG. 1.

With reference to FIGS. 3, 5 and 6, the actuation mechanism 24 is configured to selectively and alternately operate the limited slip mechanism 20 and the locking mechanism 22. In the example provided, the actuation mechanism 24 has a mount 200, a rotatable ball-ramp ring 202, a first non-rotatable ball-ramp ring 204, a set of first balls 206, a first actuation member 208, a second non-rotatable ball-ramp ring 210, a set of second balls 212, a second actuation member 214 and a plurality of rods 216.

Figure 11:
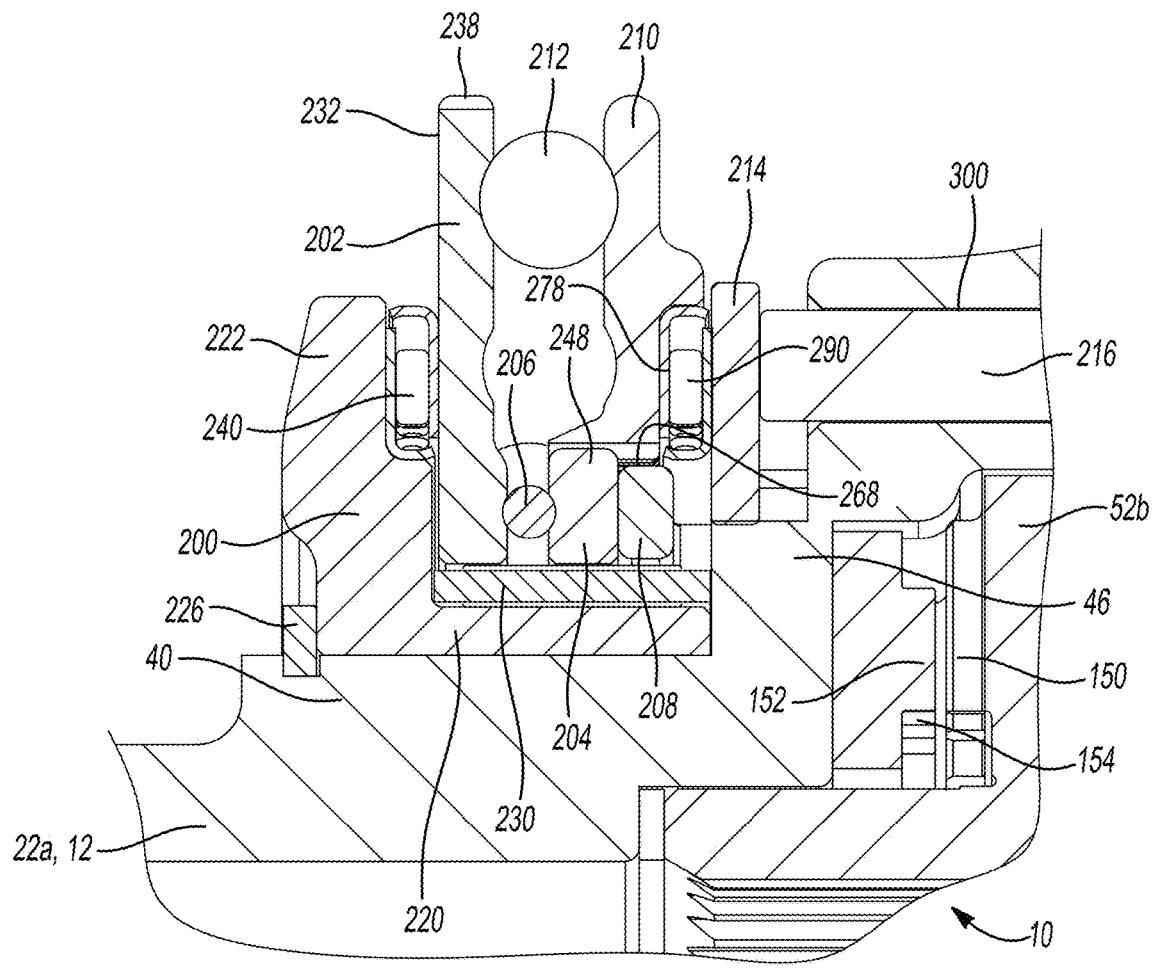
FIG. 11 is an enlarged portion of FIG. 6 illustrating the locking mechanism and an actuating mechanism in more detail.

With reference to FIG. 11, the mount 200 can comprise a sleeve member 220 and an annular-shaped wall member 222 that can extend radially outwardly from the sleeve member 220. The sleeve member 220 is received onto the circumferentially extending surface of the actuation mechanism mount 40 and is abutted against the annular shoulder wall 46. An external retaining ring 226 or other means (e.g., press-fit or integrally and unitarily forming the sleeve member 220 with the differential input member 12) can be employed to inhibit or limit axial movement of the sleeve member 220 relative to the differential input member 12 along the rotational axis 44 (FIG. 4). Optionally, the sleeve member 220 can optionally be rotatably coupled to the differential input member 12. The annular-shaped wall member 222 can be disposed on a side of the sleeve member 220 that is opposite the annular shoulder wall 46.

Figure 12:
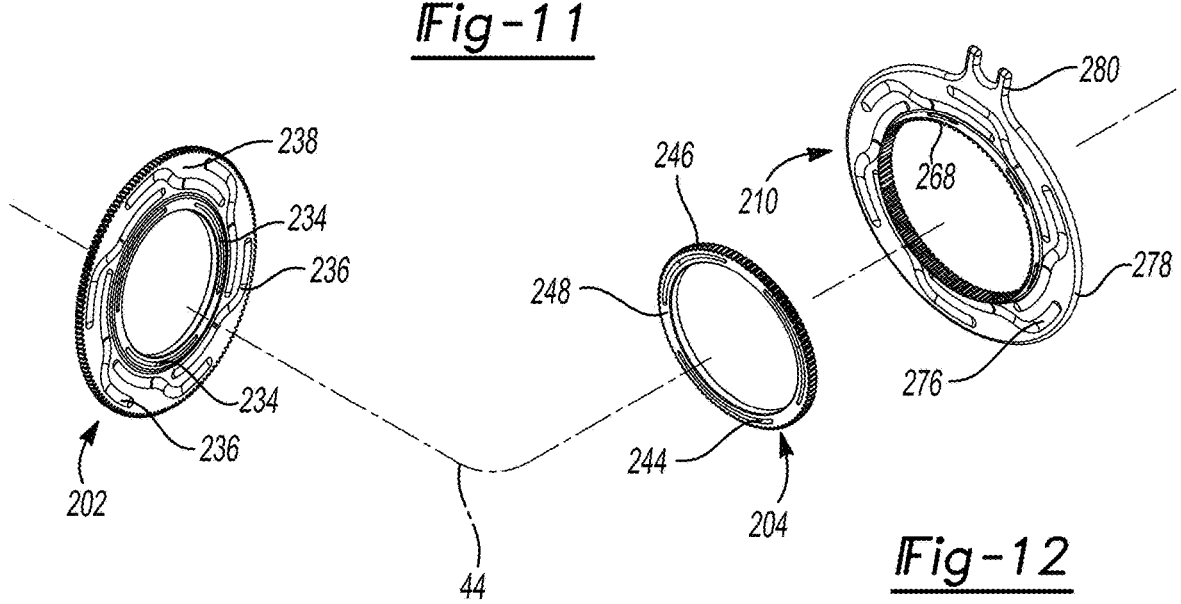
FIG. 12 is an exploded perspective view of a portion of the actuating mechanism.

With reference to FIGS. 11 and 12, the rotatable ball-ramp ring 202 is an annular structure that is rotatably mounted on the sleeve member 220. In the example provided, a bearing 230, which is comprised of a plurality of needle rollers, is disposed radially between the rotatable ball-ramp ring 202 and the annular shoulder wall 46. The rotatable ball-ramp ring 202 can have a first thrust surface 232, which is disposed adjacent the annular-shaped wall member 222, pluralities of first and second ball-ramp tracks 234 and 236, which are formed into an axial end of the rotatable ball-ramp ring 202 on a side opposite the first thrust surface 232, and a plurality of actuator teeth 238 that are formed about the outer circumference of the rotatable ball-ramp ring 202. The actuator teeth 238 are configured to be engaged by an actuator pinion (not shown) that is driven by an actuation motor (not shown), either directly or through a transmission or type of reduction mechanism (not shown). Optionally, a first thrust bearing 240 can be disposed axially between the annular-shaped wall member 222 of the actuation mechanism mount 40 and the rotatable ball-ramp ring 202.

The first non-rotatable ball-ramp ring 204 is an annular structure that is rotatably mounted on the sleeve member 220 (i.e., on the needle rollers of the bearing 230 in the example provided). The first non-rotatable ball-ramp ring 204 has a plurality of third ball-ramp tracks 244, which are formed in an axial end surface of the first non-rotatable ball-ramp ring 204 that faces toward the rotatable ball-ramp ring 202, a second thrust surface 246, which is formed on an axial end surface of the first non-rotatable ball-ramp ring 204 that faces toward the annular shoulder wall 46, and a set of external teeth or splines 248 that are disposed about the outer circumference of the first non-rotatable ball-ramp ring 204.

Each of the first balls 206 is received into an associated one of the first ball-ramp tracks 234 in the rotatable ball-ramp ring 202 and an associated one of the third ball-ramp tracks 244 in the first non-rotatable ball-ramp ring 204. It will be appreciated that the rotatable ball-ramp ring 202 (via the first ball-ramp tracks 234), the first balls 206, and the first non-rotatable ball-ramp ring 204 (via the third ball-ramp tracks 244) cooperate to form a first ball ramp mechanism.

With reference to FIGS. 3 and 11, the first actuation member 208 comprises a ring-shaped body 250 and a plurality of legs 252. The ring-shaped body 250 is rotatably mounted on the sleeve member 220 (i.e., on the needle rollers of the bearing 230 in the example provided). Each of the legs 252 can be a cylindrically shaped structure that is optionally fixedly coupled to the ring-shaped body 250. The legs 252 can be spaced circumferentially about the rotational axis 44 and can be fitted through leg apertures (not specifically shown) that are formed through the annular shoulder wall 46. Each of the leg apertures can intersect an associated tab recess 168 (FIG. 9) formed in the differential input member 12 to permit the axial ends of the legs 252 that are opposite the ring-shaped body 250 to abut an associated one of the tabs 162 on the second dog member 152.

Returning to FIGS. 11 and 12, the second non-rotatable ball-ramp ring 210 is an annular structure that is disposed concentrically about the first non-rotatable ball-ramp ring 204 and which is axially slidably but non-rotatable coupled to the first non-rotatable ball-ramp ring 204. In the example provided, the second non-rotatable ball-ramp ring 210 includes a set of internal teeth or splines 268 that are engaged to the external teeth or splines 248 that are formed onto the first non-rotatable ball-ramp ring 204. The second non-rotatable ball-ramp ring 210 has a plurality of fourth ball-ramp tracks 276, which are formed in an axial end surface of the second non-rotatable ball-ramp ring 210 that faces toward the rotatable ball-ramp ring 202, a third thrust surface 278, which is formed on an axial end surface of the second non-rotatable ball-ramp ring 210 that faces toward the annular shoulder wall 46, and an attachment member 280 that is configured to be mounted to a mating structure (not shown) to inhibit rotation of the second non-rotatable ball-ramp ring 210 about the rotational axis 44. In the example provided, the attachment member 280 is a fork-shaped arm that extends in a radial direction and which is configured to engage a rod or pin (not shown) that is coupled to the housing in which the differential assembly 10 is mounted.

Each of the second balls 212 is received into an associated one of the second ball-ramp tracks 236 in the rotatable ball-ramp ring 202 and an associated one of the fourth ball-ramp tracks 276 in the second non-rotatable ball-ramp ring 210. It will be appreciated that the rotatable ball-ramp ring 202 (via the second ball-ramp tracks 236), the second balls 212, and the second non-rotatable ball-ramp ring 210 (via the fourth ball-ramp tracks 276) cooperate to form a second ball ramp mechanism.

The second actuation member 214 is a washer-shaped structure that is mounted about the differential input member 12 proximate the annular shoulder wall 46. In the example provided, a portion of the differential input member 12 is necked down so the second actuation member 214 is slip fit to the differential input member 12. Optionally, a second thrust bearing 290 can be disposed axially between the second non-rotatable ball-ramp ring 210 and the second actuation member 214.

With reference to FIGS. 6 and 11, each of the rods 216 can be a cylindrically shaped structure, and can be received into rod apertures 300 formed longitudinally through the differential input member 12 so as to extend through both the annular shoulder wall 46 and the radially extending wall 100 of the first case member 22a.

With reference to FIGS. 6, 11 and 12, the first and third ball-ramp tracks 234 and 244 are configured such that rotation of the rotatable ball-ramp ring 202 in a first rotational direction about the rotational axis 44 relative to the first non-rotatable ball-ramp ring 204 from a neutral position to a first rotational position causes the first non-rotatable ball-ramp ring 204 to translate along the rotational axis toward the annular shoulder wall 46, as well as corresponding translation of the first actuation member 208 and the second dog member 152. When the rotatable ball-ramp ring 202 is in the first rotational position, the second dog member 152 is translated into a position in which the second teeth on the second dog member 152 are engaged to the first teeth on the first dog member 150 to non-rotatably couple the side gear 52b to the differential input member 12, which causes the differential assembly 10 to operate in a locked state that inhibits speed differentiation between the output members (i.e., the side gears 52a and 52b in the example provided) of the differential assembly 10. Rotation of the rotatable ball-ramp ring 202 from the first rotational position to the neutral position permits the return spring 154 to urge the second dog member 152, the first actuation member 208 and the first non-rotatable ball-ramp ring 204 along the rotational axis 44 toward the rotatable ball-ramp ring 202 so that the second teeth on the second dog member 152 can be disengaged from the first teeth on the first dog member 150 to permit the differential assembly 10 to operate in an open state in which speed differentiation between the output members (i.e., the side gears 52a and 52b in the example provided) of the differential assembly 10 is permitted.

The second and fourth ball-ramp tracks 236 and 276 are configured such that rotation of the rotatable ball-ramp ring 202 in the first rotational direction about the rotational axis 44 relative to the second non-rotatable ball-ramp ring 210 from the neutral position to the first rotational position, or in a second, opposite rotational direction from the first rotational position to the neutral position, has no impact on the spacing between the rotatable ball-ramp ring 202 and the second non-rotatable ball-ramp ring 210 and as such, has no impact on the operation of the limited slip mechanism 20. Moreover, due to the splined connection between the first and second non-rotatable ball-ramp rings 204 and 210 (i.e., the engagement of the set of external teeth or splines 248 on the first non-rotatable ball-ramp ring 204 with the set of internal teeth or splines 268 on the second non-rotatable ball-ramp ring 210), the first non-rotatable ball-ramp ring 204 is able to move along the rotational axis 44 relative to the second non-rotatable ball-ramp ring 210 when the rotatable ball-ramp ring 202 is moved between the neutral position and the first rotational position.

The second and fourth ball-ramp tracks 236 and 276 are configured such that rotation of the rotatable ball-ramp ring 202 in a second rotational direction about the rotational axis 44 relative to the second non-rotatable ball-ramp ring 210 from the neutral position to a second rotational position causes the second non-rotatable ball-ramp ring 210 to translate along the rotational axis toward the annular shoulder wall 46, as well as corresponding translation of the second actuation member 214 and the rods 216 and the apply plate 86. When the rotatable ball-ramp ring 202 is in the second rotational position, the apply plate 86 is translated into a position in which the clutch pack 80 is fully compressed and engaged with a predetermined force to the end wall 112 on the second case member 22b of the differential input member 12. In this condition, the differential assembly 10 will operate in a limited slip state with a maximum limited slip capability. It will be appreciated that the degree to which the clutch pack 80 is compressed (and thereby the amount of torque that can be carried by the limited slip mechanism 20) can be varied by rotating the rotatable ball-ramp ring 202 about the rotational axis 44 relative to the second non-rotatable ball-ramp ring 210 to a position that is intermediate the neutral position and second rotational position. Rotation of the rotatable ball-ramp ring 202 from the second rotational position to the neutral position permits the first and second friction plates 82 and 84 of the clutch pack 80 to disengage one another and urge the rods 216, the second actuation member 214 and the second non-rotatable ball-ramp ring 210 axially toward the rotatable ball-ramp ring 202.

The first and third ball-ramp tracks 234 and 244 are configured such that rotation of the rotatable ball-ramp ring 202 in the second rotational direction about the rotational axis 44 from the neutral position to the second rotational position, or in the first direction from the second rotational position to the neutral position, has no impact on the spacing between the rotatable ball-ramp ring 202 and the first non-rotatable ball-ramp ring 204 and as such, has no impact on the operation of the locking mechanism 22. As noted above, due to the splined connection between the first and second non-rotatable ball-ramp rings 204 and 210 (i.e., the engagement of the set of external teeth or splines 248 on the first non-rotatable ball-ramp ring 204 with the set of internal teeth or splines 268 on the second non-rotatable ball-ramp ring 210), the second non-rotatable ball-ramp ring 210 is able to move along the rotational axis 44 relative to the first non-rotatable ball-ramp ring 204 when the rotatable ball-ramp ring 202 is moved between the neutral position and the second rotational position.

While the first and second ball-ramp mechanisms have been described as being operable on an alternate basis depending on relative rotational positioning of a rotatable ball-ramp ring 202 about the rotational axis 44, it will be appreciated that alternatively, the first and second ball-ramp mechanisms could be operated in series to initially engage the limited slip mechanism 20 (without causing corresponding engagement of the locking mechanism 22) through rotation of the rotatable ball-ramp ring 202 in one rotational direction from the neutral position to the first rotational position, and thereafter to cause engagement of the locking mechanism 22 through further rotation of the rotatable ball-ramp ring 202 in the same rotational direction into a second rotational position. The first and third ball-ramp tracks 234 and 244 on the rotatable ball-ramp ring 202 and the first non-rotatable ball-ramp ring 204 can be configured so as to not move the first non-rotatable ball-ramp ring 204 when the rotatable ball-ramp ring 202 is rotated between the neutral position and the first rotational position. Similarly, the second and fourth ball-ramp tracks 236 and 276 on the rotatable ball-ramp ring 202 and the second non-rotatable ball-ramp ring 210 can be configured so as to not move the second non-rotatable ball-ramp ring 210 when the rotatable ball-ramp ring 202 is rotated between the first rotational position and the second rotational position. Alternately, the second and fourth ball-ramp tracks 236 and 276 on the rotatable ball-ramp ring 202 and the second non-rotatable ball-ramp ring 210 can be configured so as to permit the second non-rotatable ball-ramp ring 210 to move along the rotational axis 44 toward the rotatable ball-ramp ring 202 (to thereby reduce the axial load on the clutch pack 80) when the rotatable ball-ramp ring 202 is rotated between the first rotational position and the second rotational position.

Figure 7A:
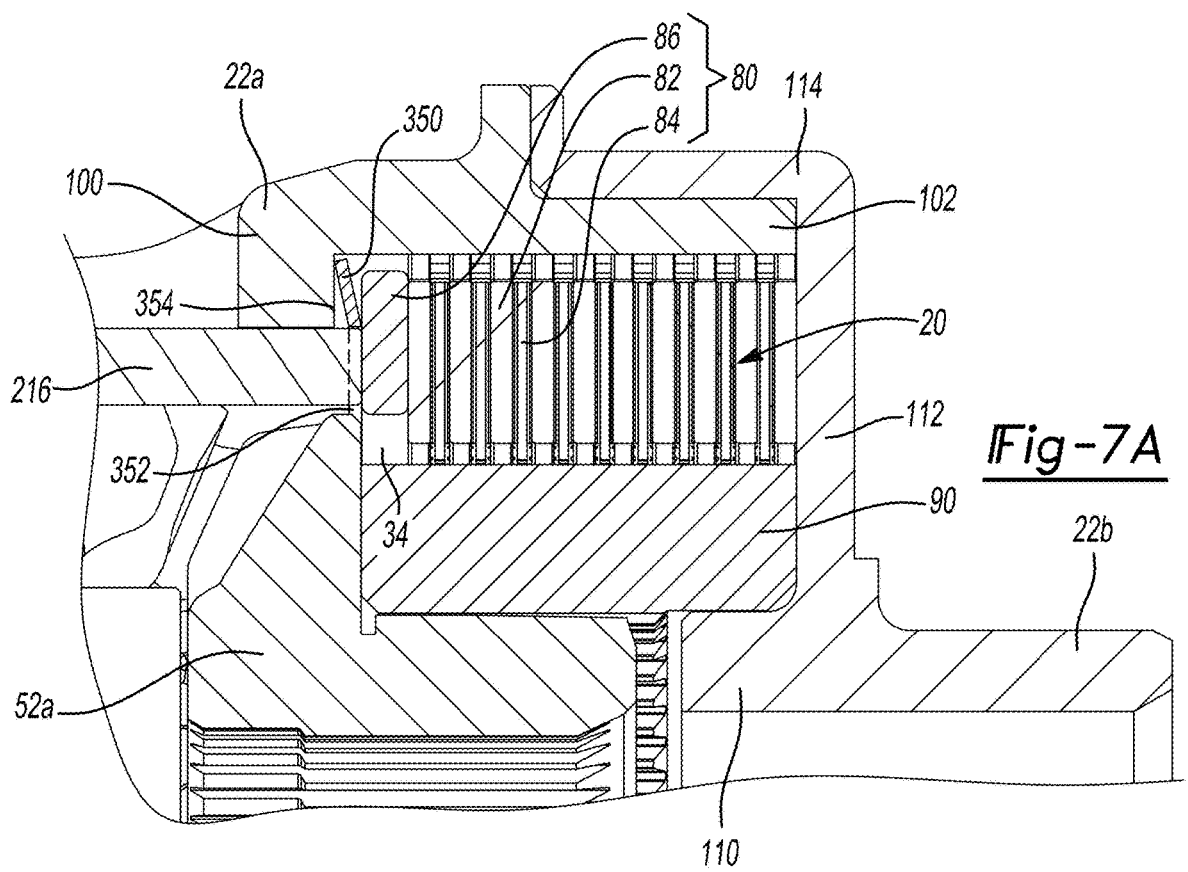
FIG. 7A is a view similar to that of FIG. 7 but depicting an optional preload spring for applying a preload to the clutch pack of the limited slip mechanism.

With reference to FIGS. 6, 7 and 11, the limited slip mechanism 20 is loaded to its minimum extent when the rotatable ball-ramp ring 202 is positioned in its neutral position. In this condition, there may be no load on the clutch pack 80 and it may be possible to space the first and second friction plates 82 and 84 apart from one another so that the differential assembly 10 would operate as an open differential. Alternatively, the limited slip mechanism 20 could be configured to apply a preload to the clutch pack 80 so that the limited slip mechanism is operable to some extent to reduce individual wheel spin when the rotatable ball-ramp ring 202 is positioned in its neutral position. For example, one or more springs (not shown) can be incorporated into a load path between the second non-rotatable ball-ramp ring 210 and the apply plate 86. With reference to FIG. 7A, a preload spring 350 can alternatively be integrated into the limited slip mechanism 20. The preload spring 350 can include one or more of any desired spring, but in the particular example provided the preload spring 350 is a Belleville spring washer. The preload spring 350 can be disposed in-line with the rods 216, but in the example provided, the preload spring 350 disposed out-of-line with the rods 216 so that the actuation mechanism 24 (FIG. 3) does not transmit load through the preload spring 350 when the actuation mechanism 24 (FIG. 3) operates the limited slip mechanism 20. In the example provided, the preload spring 350 is received between an annular interior wall 354 on the first case member 22a and the apply plate 86 with the outer diameter of the Belleville spring washer being disposed against the annular interior wall 354 and a smaller-diameter central portion of the Belleville spring washer being disposed against the apply plate 86. A central aperture 352 formed through the Belleville spring washer is sized large enough in diameter such that the rods 216 travel through the Belleville spring washer when the actuation mechanism (FIG. 3) operates the limited slip mechanism 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a differential assembly that includes:
a differential input member that is rotatable about an axis;
a differential gearset disposed in the differential input member, the differential gearset having a first side gear and a second side gear;
a limited slip clutch having a clutch pack with a set of first clutch plates, which are non-rotatably but axially slidably coupled to the differential input member, and a set of second clutch plates that are interleaved with the first clutch plates and which are axially slidably but non-rotatably coupled to the first side gear;
a locking clutch having a first dog member, which is fixedly coupled to the second side gear, and a second dog member that is axially slidably but non-rotatably coupled to the differential input member, the second dog member being movable along the axis between a first position, in which the second dog member is disengaged from the first dog member so as to permit rotation of the first dog member relative to the second dog member, and a second position in which the second dog member is engaged to the first dog member so as to inhibit rotation of the first dog member relative to the second dog member; and an actuation mechanism for operating the limited slip clutch and the locking clutch, the actuation mechanism having a first ball-ramp mechanism for selectively operating the locking clutch and a second ball-ramp mechanism for selectively operating the limited slip clutch, the first and second ball-ramp mechanisms each having a set of rotatable ball-tracks and wherein the set of rotatable ball-tracks of the first ball-ramp mechanism are rotationally coupled to the set of rotatable ball-tracks for the second ball-ramp mechanism.

2. The vehicle driveline component of claim 1, wherein the first and second ball-ramp mechanisms each have a set of non-rotatable ball-tracks and wherein the set of non-rotatable ball-tracks of the first ball-ramp mechanism are non-rotatably but axially slidably coupled to the set of non-rotatable ball-tracks for the second ball-ramp mechanism.

3. The vehicle driveline component of claim 2, wherein the non-rotatable ball-track of one of the first and second ball-ramp mechanisms is formed with an internally-splined aperture, and wherein the non-rotatable ball-track of the other one of the first and second ball-ramp mechanisms is formed with an externally-splined circumferential surface that is matingly engaged to the internally-splined aperture.

4. The vehicle driveline component of claim 2, wherein the rotatable and the non-rotatable ball-tracks of the first and second ball-ramp mechanisms are rotatably disposed on the differential input member.

5. The vehicle driveline component of claim 1, wherein the rotatable ball-track of the first ball-ramp mechanism is rotatable in a first rotational direction relative to the differential input member to move the second dog from the first position to the second position, and wherein the rotatable ball-track of the second ball-ramp mechanism is rotatable in a second rotational direction relative to the differential input member that is opposite the first rotational direction to compress the clutch pack.

6. The vehicle driveline component of claim 1, wherein the actuation mechanism further comprises a plurality of pins that extend through the differential input member between the non-rotatable ball-track of the second ball-ramp mechanism and the clutch pack of the limited slip clutch.

7. The vehicle driveline component of claim 6, wherein the limited slip clutch comprises a preload spring that applies a preload to the clutch pack.

8. The vehicle driveline component of claim 7, wherein the preload spring is disposed between the differential input member and the clutch pack.

9. The vehicle driveline component of claim 8, wherein the pins are received through the preload spring.

10. The vehicle driveline component of claim 1, wherein the limited slip clutch comprises a preload spring that applies a preload to the clutch pack.

11. The vehicle driveline component of claim 10, wherein the preload spring is disposed between the differential input member and the clutch pack.

12. The vehicle driveline component of claim 1, wherein the locking clutch is disposed along the axis between the limited slip clutch and the actuation mechanism.

13. A vehicle driveline component comprising:
a differential assembly that includes:
a differential input member that is rotatable about an axis;
a differential gearset disposed in the differential input member, the differential gearset having a first side gear and a second side gear;
a limited slip clutch having a clutch pack with a set of first clutch plates, which are non-rotatably but axially slidably coupled to the differential input member, and a set of second clutch plates that are interleaved with the first clutch plates and which are axially slidably but non-rotatably coupled to the first side gear;

a coupling having a first coupling member, which is fixedly coupled to the second side gear, and a second coupling member that is slidable along the axis relative to the first coupling member between a first position, in which the second coupling member is rotationally decoupled from the first coupling member, and a second position in which the second coupling member is coupled for rotation with the first coupling member; and an actuation mechanism for operating the limited slip clutch and the coupling, the actuation mechanism having a first ball-ramp mechanism for selectively operating the coupling and a second ball-ramp mechanism for selectively operating the limited slip clutch, the first and second ball-ramp mechanisms each having a set of rotatable ball-tracks and wherein the set of rotatable ball-tracks of the first ball-ramp mechanism are rotationally coupled to the set of rotatable ball-tracks for the second ball-ramp mechanism.

14. The vehicle driveline component of claim 13, wherein the second coupling member is rotatably coupled to the differential input member.

15. The vehicle driveline component of claim 13, wherein one of the first and second coupling members defines a plurality of teeth that are configured to engage the other one of the first and second coupling members when the second coupling member is in the second position.

16. The vehicle driveline component of claim 15, wherein the other one of the first and second coupling members has a plurality of mating teeth that engage the teeth on the one of the first and second coupling member when the second coupling member is in the second position.

17. The vehicle driveline component of claim 13, wherein the first and second ball-ramp mechanisms each have a set of non-rotatable ball-tracks and wherein the set of non-rotatable ball-tracks of the first ball-ramp mechanism are non-rotatably but axially slidably coupled to the set of non-rotatable ball-tracks for the second ball-ramp mechanism.

18. The vehicle driveline component of claim 17, wherein the non-rotatable ball-track of one of the first and second ball-ramp mechanisms is formed with an internally-splined aperture, and wherein the non-rotatable ball-track of the other one of the first and second ball-ramp mechanisms is formed with an externally-splined circumferential surface that is matingly engaged to the internally-splined aperture.

19. The vehicle driveline component of claim 17, wherein the rotatable and the non-rotatable ball-tracks of the first and second ball-ramp mechanisms are rotatably disposed on the differential input member.

20. The vehicle driveline component of claim 13, wherein the rotatable ball-track of the first ball-ramp mechanism is rotatable in a first rotational direction relative to the differential input member to move the second dog from the first position to the second position, and wherein the rotatable ball-track of the second ball-ramp mechanism is rotatable in a second rotational direction relative to the differential input member that is opposite the first rotational direction to compress the clutch pack.

21. The vehicle driveline component of claim 13, wherein the actuation mechanism further comprises a plurality of pins that extend through the differential input member between the non-rotatable ball-track of the second ball-ramp mechanism and the clutch pack of the limited slip clutch.

22. The vehicle driveline component of claim 21, wherein the limited slip clutch comprises a preload spring that applies a preload to the clutch pack.

23. The vehicle driveline component of claim 22, wherein the preload spring is disposed between the differential input member and the clutch pack.

24. The vehicle driveline component of claim 23, wherein the pins are received through the preload spring.

25. The vehicle driveline component of claim 13, wherein the limited slip clutch comprises a preload spring that applies a preload to the clutch pack.

26. The vehicle driveline component of claim 25, wherein the preload spring is disposed between the differential input member and the clutch pack.

27. The vehicle driveline component of claim 13, wherein the locking clutch is disposed along the axis between the limited slip clutch and the actuation mechanism.

\* \* \* \* \*